United States Patent
Tondering (10) Patent No.: US 8,816,813 B2
(45) Date of Patent: Aug. 26, 2014

(54) HEADSET HUB REMOTE CONTROL SYSTEM

(75) Inventor: Claus Tondering, Kgs. Lyngby (DK)

(73) Assignee: GN Netcom A/S (DK)

( * ) Notice: Subject to any disclaimer, the term of this patent is extended or adjusted under 35 U.S.C. 154(b) by 697 days.

(21) Appl. No.: 12/875,856

(22) Filed: Sep. 3, 2010

(65) Prior Publication Data

US 2011/0032071 A1 Feb. 10, 2011

Related U.S. Application Data (63) Continuation-in-part of application No. PCT/DK2009/000058, filed on Mar. 3, 2009.

(51) Int. Cl.
| | | |
|---|---|---|
| *G09G 5/00* | (2006.01) | |
| *G05B 19/02* | (2006.01) | |
| *G05B 11/01* | (2006.01) | |
| *G08B 23/00* | (2006.01) | |
| *H04B 1/20* | (2006.01) | |

(52) U.S. Cl.
CPC .................................... H04B 1/202 (2013.01)
USPC ........ 340/4.31; 340/4.3; 340/501; 340/12.22; 345/156

(58) Field of Classification Search
None
See application file for complete search history.

(56) References Cited

U.S. PATENT DOCUMENTS

| | | | |
|---|---|---|---|
| 6,223,029 B1 | 4/2001 | Stenman et al. | |
| 7,800,044 B1 * | 9/2010 | Kahn et al. | 250/214 AL |
| 2002/0040255 A1 * | 4/2002 | Neoh | 700/94 |
| 2002/0068610 A1 | 6/2002 | Anvekar et al. | |
| 2002/0115478 A1 | 8/2002 | Fujisawa et al. | |
| 2002/0115479 A1 | 8/2002 | Tischler | |
| 2004/0147282 A1 | 7/2004 | Nakasato et al. | |
| 2004/0247138 A1 | 12/2004 | Wang | |
| 2006/0062400 A1 | 3/2006 | Chia-Chun | |
| 2006/0065709 A1 | 3/2006 | Yamashita | |
| 2007/0264937 A1 | 11/2007 | Han et al. | |
| 2008/0070516 A1 * | 3/2008 | Lee et al. | 455/90.1 |
| 2008/0303681 A1 * | 12/2008 | Herz et al. | 340/671 |
| 2009/0252311 A1 * | 10/2009 | Kuiken | 379/102.02 |
| 2009/0318081 A1 * | 12/2009 | Winter | 455/41.2 |
| 2010/0151788 A1 * | 6/2010 | Rahman et al. | 455/41.2 |

FOREIGN PATENT DOCUMENTS

| | | |
|---|---|---|
| EP | 1443665 | 8/2004 |
| JP | 2005-244676 | 9/2005 |
| WO | WO 2007/005175 | 1/2007 |
| WO | WO 2007/101479 | 9/2007 |

OTHER PUBLICATIONS

Bluetooth Audio/Video Working Group: "Audio/Video Remote Control Profile V1.0" Internet Citation, XP002412760, retrieved online Dec. 22, 2006.
International Search Report for PCT/DK2009/000058.
First Chinese Office Action for CN Application No. 200980107382.5 dated Sep. 26, 2012 issued by SIPO with English translation.
Second Chinese Office Action for CN Application No. 200980107382.5 dated Jun. 26, 2013 issued by SIPO with English translation.

* cited by examiner

*Primary Examiner* — George Bugg
*Assistant Examiner* — Renee Dorsey
(74) *Attorney, Agent, or Firm* — Altera Law Group. LLC (57) ABSTRACT

A system comprising a wireless audio headset hub (1), at least two peripheral electronic devices (3, 4, 5) which are wirelessly connected to and controlled via the headset (1). The system further comprises a wireless handheld terminal (2), which is wirelessly connected to the headset (1) and comprising a terminal user interface (7) for receiving user input. The headset (1) and the terminal (2) are adapted so that a user by means of the terminal user interface (7) can control each of the peripheral electronic devices (3, 4, 5) via the headset (1).

18 Claims, 4 Drawing Sheets

HEADSET HUB REMOTE CONTROL SYSTEM

CROSS-REFERENCE TO RELATED APPLICATION

This application is a Continuation-In-Part of co-pending International Application Number PCT/DK2009/000058, filed on 3 Mar. 2009.

TECHNICAL FIELD

The disclosure relates to a system comprising a wireless audio headset, at least two peripheral electronic devices, which are wirelessly connected to and controlled via the headset, a wireless handheld terminal, which is wirelessly connected to the headset and comprising a user interface for receiving user input where the headset is the central control or hub of the system.

BACKGROUND ART

A headset is a headphone, which is normally combined with a microphone, and which is becoming more and more widely used in telecommunication. Especially wireless headsets are increasingly popular.

More and more devices can be used together with wireless headsets. A wireless headset can be connected to a mobile phone, a landline phone (PSTN), a computer, a music player, even a television or a DVD player. In the industry, this phenomenon is known as "convergence". There has been a long felt need to provide a single device which can control other devices and still function effectively in its primary role. The mobile (cell) phone is the device of choice for this purpose but the modifications to achieve this role are great and thus far unachievable. A new approach is needed.

Because of the limited size of a headset, and because it normally has to be operated while located on the user's head or ear, interaction with the user becomes a challenge. Due to its size, the headset can normally only have very few buttons, and most feedback from the headset to the user has to be aural rather than visual.

In a scenario where a headset is connected to several devices simultaneously, it is very difficult to design a user interface through which the user may select a sound source and control the remote device in a simple and intuitive manner.

One solution is shown in US 2002/0068610. Keys on the headset or a voice-recognition unit on the headset is used to control various devices which are wirelessly connected to the headset. In order to choose between the many commands that are needed to control the remote devices, a large number of buttons (or very complex button press sequences) are required. Furthermore, visual feedback to the user is not normally possible. Voice-recognition is disadvantageous as it may disturb the surroundings and be complex to use.

Another solution is to use a separate remote control unit (or several remote control units) to control the remote devices. This means that the user will need to carry one or more extra items. Also, logical interaction between the different units becomes difficult or impossible. If a call comes in on the mobile phone, the music player should stop playing during the phone conversation.

A third solution is to use a mobile phone as a remote control as proposed in US 2006/0065709. A direct wireless link (according to the Bluetooth standard) is established between the mobile phone and the remote-controlled device. In order to simultaneously listen to audio signals from a device through the headset and control the device via the mobile phone, this is only possible if the remote devices are capable of handling wireless connections to multiple devices; and even if this is possible, the number of wireless connections which the user must set up and manage is almost doubled. Another problem with this solution is that the modifications to the mobile phone are significant and it may be hard to get manufacturers of such devices to add the hardware necessary to communicate with different devices. Therefore making the mobile phone the center of controls over multiple devices, might seem like the obvious solution, its implementation creates many new problems.

The present invention addresses these problems and provides an unexpected solution which has been much sought after in prior attempts but not achieved.

SUMMARY

A feature of the disclosure is to improve the way in which the system according to the preamble is remote-controlled.

The system according to the present disclosure has the headset and the terminal adapted so that a user by virtue of the terminal user interface can control each of the peripheral electronic devices via the headset. Thus, the peripheral electronic devices must only be wirelessly connected to one device, namely the headset, which is the hub and performs all of the major functions, while the handheld terminal (preferably a mobile phone) operates to provide keyboard and display capabilities to a headset hub According to a preferred embodiment, the user by using the user interface is able to open an audio channel between the headset and one selected peripheral electronic device.

According to another embodiment, the wireless handheld terminal has a display. This improves the possibility for making the terminal more user friendly.

According to one embodiment, the user, by virtue of the user interface, chooses a single device to control, wherein the display clearly indicates, which device is chosen to be controlled. In this way, the user clearly knows which device he is controlling.

Preferably, the display is adapted to indicate which functions of the chosen device can be controlled by the terminal.

Another preferable option is that the display indicates how a specific user input corresponds to a specific controllable function.

The peripheral electronic devices may comprise one or more of the following devices: a television, a media player, a video recorder and a personal computer. Thus, the terminal can be used to turn volume up and down, change channel, stop, play, skip audio tracks, fast forward, rewind etc.

According to a preferred embodiment, the wireless handheld terminal is a mobile phone. In this case, the mobile phone can be used as a remote control when not used for phone conversations. Alternatively, the wireless handheld terminal is a wireless phone or a personal digital assistant (PDA).

Preferably, the user interface comprises a keypad.
According to a specific embodiment:
the wireless handheld terminal comprises
   a terminal control unit for generating first control commands in response to the user input,
   a terminal transmitter for transmitting the first control commands to the headset, wherein
the headset comprises
   a headset receiver for receiving the first control commands from the terminal, a headset control unit for generating second control commands in response to the reception of the first control commands, a headset transmitter for transmitting the second control commands to one of the peripheral electronic devices, and wherein each of the peripheral electronic devices comprises a device receiver for receiving the second control commands, a device control unit for controlling the device in response to the reception of the second control commands.

Preferably, the headset comprises at least one speaker and a headset receiver for receiving a first audio signal and relaying the first audio signal to the speaker.

According to a further preferred embodiment, the same headset receiver is adapted to receive the first control commands and the audio signal.

The headset preferably comprises a microphone and a headset transmitter for transmitting a second audio signal generated by the microphone. Such a headset is useful for two-way communications via a mobile phone, a wireless phone or a soft phone installed on a personal computer.

Preferably, the same headset transmitter is adapted to transmit the second control commands and the second audio signal.

The disclosure also illustrates a method of remote controlling at least two peripheral electronic devices, which are wirelessly controllable by means of a wireless handheld terminal comprising a user interface for receiving user input, such that a user can control each of the peripheral electronic devices by the terminal, wherein first control signals are sent from the terminal to a wireless headset as a result of user input, and wherein the headset as a result of the reception of the first control signals from the terminal generates and transmits second control signals to one of the peripheral electronic devices.

Furthermore, the invention relates to an audio headset system comprising:

a) a wireless audio headset for use with at least two peripheral electronic devices (3, 4, 5) which are controlled directly from said headset b) a wireless handheld terminal, which is wirelessly connected to the headset, said handheld terminal including a terminal user interface for receiving user input, wherein the headset and the terminal are adapted such that a user by means of the terminal user interface can control each of the peripheral electronic devices via the headset, and wherein the user by using the user interface is able to open an audio channel between the headset and one selected peripheral electronic device.

The above summary is intended to help the reader understand the full disclosure and the claims which follow. The summary is only a fraction of the full disclosure and should not be read as a replacement therefore.

BRIEF DESCRIPTION OF THE DRAWINGS

The invention is explained in detail below with reference to the drawing illustrating a preferred embodiment of the invention and in which.

The following reference signs are used in the figures and the following detailed description of the preferred embodiments:

| | |
|---|---|
| 1 | wireless headset and hub |
| 2 | mobile phone |
| 3 | television |
| 4 | music player |
| 5 | personal computer |
| 5a | other peripheral device |
| 6 | display of mobile phone |
| 7 | keypad of mobile phone |
| 8 | microphone of mobile phone |
| 9 | ear hook |
| 10 | speaker of headset |
| 11 | microphone of headset |
| 12 | mobile phone control unit |
| 13 | mobile phone transceiver |
| 14 | headset receiver |
| 15 | headset control unit |
| 16 | headset transmitter |
| 17 | Bluetooth link |
| 18 | mobile telephony module |
| 19 | speaker of mobile phone |
| 31 | TV Bluetooth transceiver |
| 32 | TV control unit |
| 33, 43, 53 | Bluetooth links |
| 41 | music player Bluetooth transceiver |
| 42 | music player control unit |
| 51 | PC Bluetooth transceiver |
| 52 | PC control unit |

DETAILED DESCRIPTION

The prior systems such as US2006/0065709 have focused on using the mobile phone as the hub control of a music player. This would be the obvious choice, but we have found that there is a better solution. The present invention takes a counter intuitive approach to remote control of remote devices. In the preferred embodiment, it makes the headset the hub, even though it is an unlikely device for that purpose. It is counterintuitive, because modern headsets are small, have few controls, and when worn, the user can see none of the controls. Yet, the headset can contain all of the electronics and software/firmware needed to make it a hub and it only needs to be able to communicate with a mobile phone and take control of the keyboard and/or screen. The well known Bluetooth® system and other software cited below, provide the necessary links and access to the mobile phone. On most terminal devices it is possible to download "apps" (applications) which can modify the user interface without requiring hardware modifications to the device. Thus the mobile phone is largely unmodified, meaning, that by moving the hub to the counterintuitive locations of a headset, the headset manufacturer does not need to negotiate with hundreds of mobile phone suppliers to have the necessary hub hardware built in. Thus the present invention succeeds where others have long tried to solve: remote access to other devices with the mobile device only used to provide visual display and a keypad.

Figure 1:
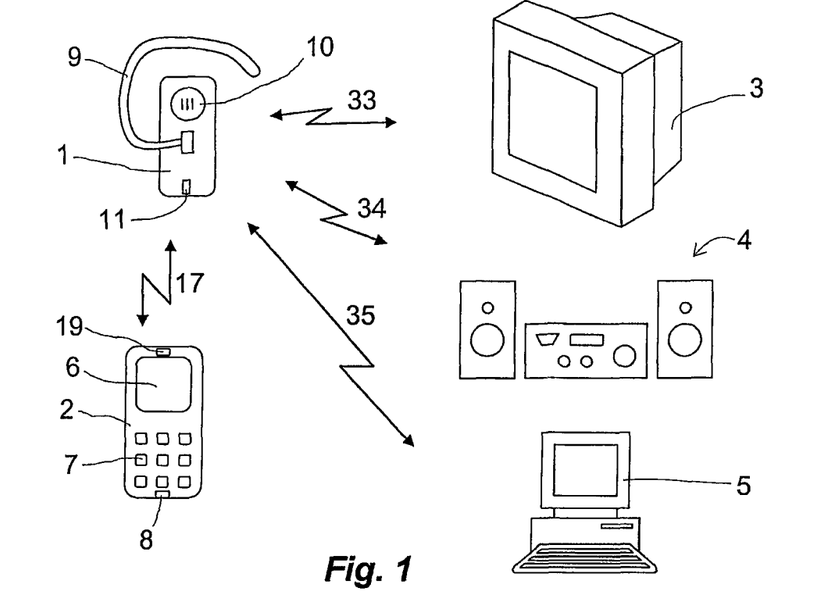
FIG. 1 is a schematic disclosure of a wirelessly interconnected system comprising a headset, a mobile phone, a TV, a music player and a personal computer.

FIG. 1 shows one possible convergence scenario, where a headset hub 1 is connected to a mobile phone 2, a TV (television) 3, a music player (home audio system) 4 and a PC (personal computer) 5. The headset 1 is a modern wireless communications headset, which exchanges audio and control signals with other electronic devices using a wireless connection according to the Bluetooth standard.

The headset 1 comprises an earhook 9, a speaker 10 and a microphone 11. It is connected by means of a Bluetooth link 17 to the mobile phone 2 and via Bluetooth links 33, 34, 35 to the TV 3, the music player 4 and the PC 5 respectively. It also contains software and hardware needed to carry out the hub function as will be explained below.

The mobile phone 2 comprises a display 6, a keypad 7, a microphone 8 and a speaker 19. The mobile phone 2 comprises a microphone 8, a speaker 19, a display 6 and a user interface in the form of a keypad 7.

In this embodiment instead of using the headset 1 to select an audio source 3, 4, 5 and control the remote device 3, 4, 5, the mobile phone 2 is used as the control console. An application (typically, a so-called Java® MIDlet) is loaded on the mobile phone 2. This application turns the phone 2 into a master control console for the entire scenario. Using the mobile phone 2, the user can generate quite complex commands, which are then sent to the headset 1, using a protocol. The headset 1 recognizes two sets of commands:

a) commands for the headset 1 itself (one of the most important commands here will be an instruction to open an audio channel to a particular remote device 3, 4, 5)

b) commands for the remote devices 3, 4, 5. The headset 1 converts these commands to the appropriate control protocol for the selected external device 3, 4, 5 and passes the commands on to that device 3, 4, 5. Thus the headset becomes the hub and the mobile phone is used for its superior display and keypad. Keystrokes on the mobile phone (terminal) are assigned to desired functions and screen displays by the application software (app) which was installed to the phone either by traditional means, or by a link (f. ex Bluetooth® from the headset hub itself). The phone provides a convenient display and keyboard for the headset. In the preferred embodiment, a key stroke entered on the phone is sent back to the headset which issues further commands to peripheral devices (3,4,5). In the preferred embodiment, the headset hub 1, in response to keystrokes on the terminal (phone) 2 issues commands to the peripheral devices directly, without further involvement of the phone 2. Thus, the headset hub, can link, for example, audio with device 4 via, for example Bluetooth®, Infra red (IR) or any other link in existence or yet to be developed.

In addition to display of commands on the mobile phone headset, it is possible to use voice confirmations in place or to supplement the phone's display. When a key is depressed on the phone (or a command is spoken on the headset), the command which it has been assigned to that key or voice command, the phone display may indicate the command on screen. Likewise, if the user depresses a key on the phone, it may be displayed on screen of the phone but the app would also send a command back to the headset hub to issue an appropriate voice confirmation in the headset earpiece. This provides audible confirmation to the user without the need to look at the display on the phone. Furthermore, if the phone has a diminutive screen there may not be enough space to spell out the command function in full text. For example, if Key nr 5 has been reassigned as "volume UP on stereo device", it may be abbreviated on screen as Vol Up, but the voice confirmation can speak a verbose phrase directly into the ear of the user "volume Up on Sony® stereo tuner".

Since the headset is a bidirectional device, it can also receive commands or cancel audible confirmations. Taking the last example, if the audible confirmation says "volume UP on stereo", the user could speak, NO, Error, More (for more volume), Go Back, etc. Therefore, combining the headset as a hub, the keyboard and screen of the mobile phone with audible confirmations and the ability to respond thereto (No, Error, etc), an entirely new and powerful remote hub can be created in the unlikely location of a headset and without the need to substantially modify the mobile phone.

Figure 2:
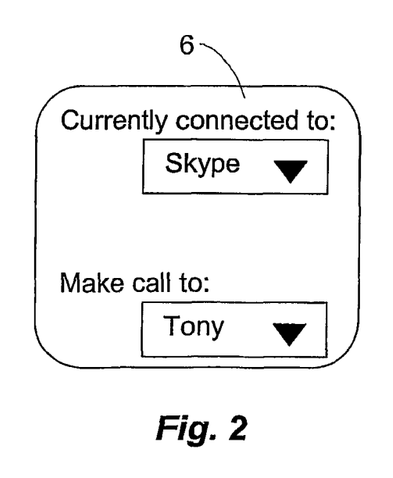
FIGS. 2 and 3 are screenshots of the display on the mobile phone in the system of FIG. 1.
Figure 3:
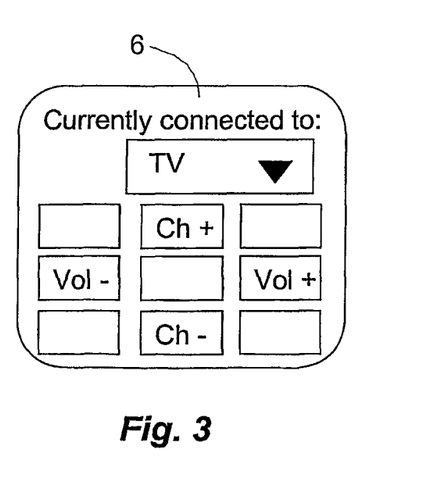

FIGS. 2 and 3 show what screenshots of the application on the mobile phone 2 might look like. At the top of the screen 6, a drop down box allows the user to select the current device. The lower part of the screen then shows functions that are relevant to this particular device. In the left image of FIG. 2, the headset is connected to the PC 5 with, for example, a Skype®connection (or other Internet based telephony). The drop down box at the bottom contains the contents of the Skype® phone book, which the headset 1 has extracted from the PC 5. The user can use this to make a call even if the PC 5 is a few meters away. In FIG. 3, the headset 1 is connected to the television 3, and the lower part of the screen shows the effect of pressing one of the keys on the phone keypad 7. Thus, four of the keys can be used to adjust the volume and change channel. When the headset 1 is connected to the music player 4, the application on the mobile phone 2 makes it possible to change audio source, such as CD player or radio, and choose or skip tracks, etc. It will be appreciated, that the imprinted key labels on the mobile phone cannot be changed, but the control software (app) which modifies the function of each key can also display a key image/map such as shown in FIGS. 2 and 3 on the display of the phone. Thus the user can look at the screen keymap and press the correct key even if unlabeled. On touch screen devices, the keys may be superfluous. It would also be desirable to have the key stroke function played back verbally (text to speech conversion) thru the transmission link (17, 35) into the headset speaker 10, so the headset wearer gets verbal confirmation that the correct key stroke has been depressed. If the wrong key is depressed, the user could speak "no" or other command into the headset mic to countermand the keystroke.

Figure 4:
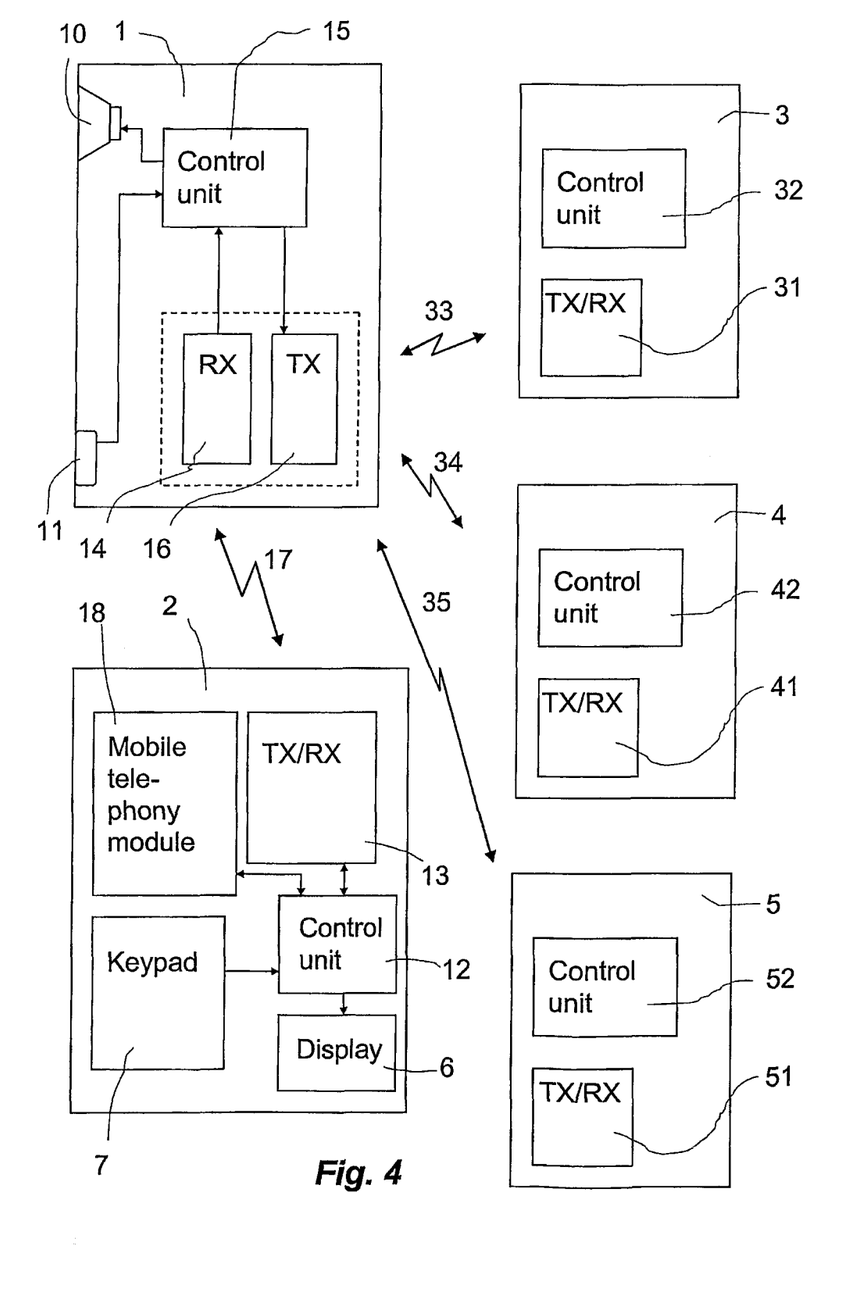
FIG. 4 is a block diagram of the system of FIG. 1, FIG. 5 discloses a flow chart of one embodiment of how a user can control the system.

FIG. 4 discloses a block diagram of the system of FIG. 1. Some main components of the different devices are shown.

The headset 1 comprises a Bluetooth receiver (RX) 14, a Bluetooth transmitter (TX) 16, a headset control unit 15, speaker 10 and a microphone 11. As indicated with the dotted line, a Bluetooth transceiver (TX/RX) could replace the separate receiver 14 and the separate transmitter 16. Furthermore, a wireless receiver and transmitter following other standards than Bluetooth, such as DECT, could be used. The receiver 14 and the transmitter 16 are connected to the headset control unit 15, which in turn is connected to the speaker 10 and the microphone 11. The receiver 14 is adapted to receive audio, data and control signals from the mobile phone 2 as this is working as a remote control unit. The receiver 14 is furthermore able to receive audio, data and control signals from the PC 5, the mobile phone 2, the TV 3, the music player 4 and the PC 5. The headset control unit 15 converts commands received from the mobile phone 2 to the appropriate control protocol for the selected external device 3, 4, 5. The headset transmitter 16 can transmit these converted commands to that device 3, 4, 5. Furthermore, the headset transmitter 16 is able to transmit audio signals generated by the headset microphone 11 to the mobile phone 2 and the PC 5.

The mobile phone 2 comprises a mobile telephony module 18, which allows wireless communication with a mobile phone network. Furthermore, the mobile phone 2 comprises a keypad 7, a display 6, a phone control unit 12 and a Bluetooth Transceiver (TX/RX) 13. A remote control application is installed on the mobile phone 2 whereby it can be used as a remote control. The Bluetooth transceiver 13 is able to transmit and receive control signals and audio signals to and from the headset 1 via the Bluetooth link 17.

The TV 3 comprises a TV control unit 32 and a Bluetooth transceiver 31. The headset 1 transmits control signals to the TV 3 and receives audio and control signals from the TV 3 via the Bluetooth link 33.

The music player 4 comprises a music player control unit 42 and a music player Bluetooth transceiver 41. The headset 1 transmits control signals to the music player 4 and receives audio and control signals from the music player 4 via the Bluetooth link 34.

The PC 5 comprises a PC control unit 52 and a PC Bluetooth transceiver 51. The headset 1 exchanges audio, control and data signals with the PC 5 via the Bluetooth link 35.

Figure 5:
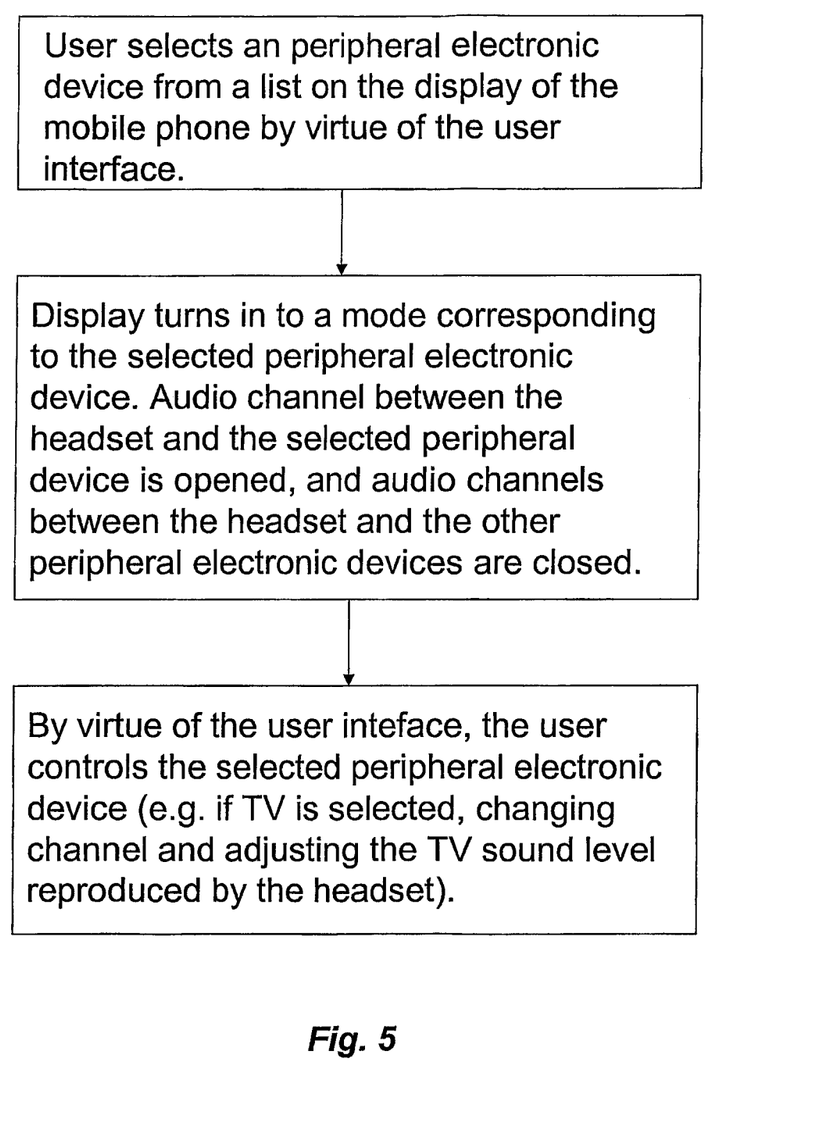
Figure 6:
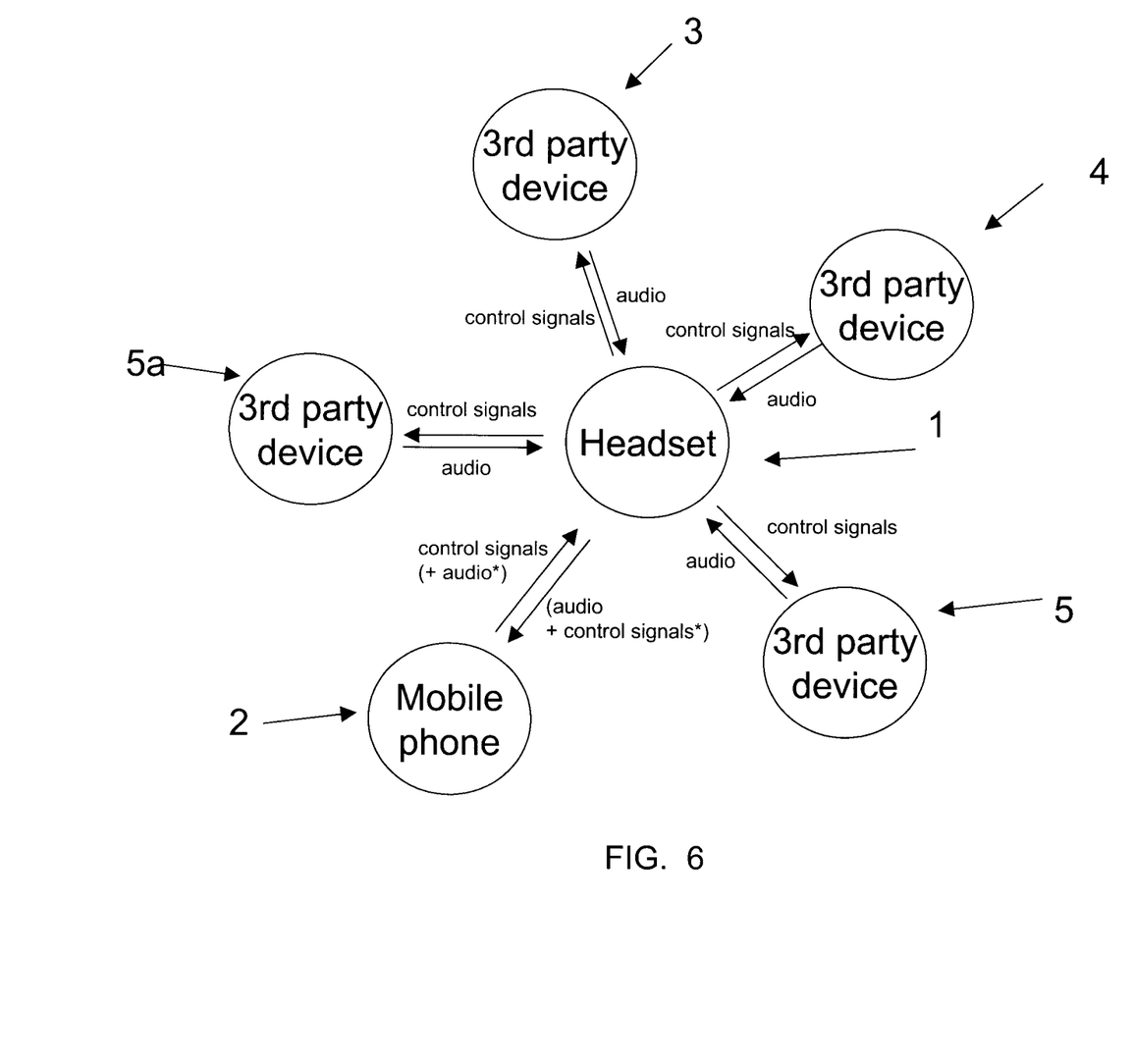
FIG. 6 is a diagrammatic representation of one embodiment.

FIG. 5 illustrates how the system may be configured. Third party devices 3, 4, 5 and 5a and linked to the headset hub 1 via, for example, Bluetooth® and IR. Control signals are sent to the devices, but they are issued either from a keystroke on the mobile phone/terminal 2 or by voice command on the headset 1. Either way, they are preferably displayed on the screen of the headset and a verbal confirmation may be sent back thru the headset speaker. A control signal is issued by the headset by a link to the selected peripheral device and a response is generated in the device. In most cases, that will be an audio signal coming back from the device to the headset.

There may also be a signal priority established. For example, if music is coming from device 3, device 4 which could for example be voice reports from a GPS system, the GPS may have override priority. If the system also included other devices 5 such as a collision avoidance system with audio output, such system could be ranked with an even higher priority and override the audible communications of other lesser devices.

As the peripheral electronic devices 3, 4, 5 are able to send control signals to the headset 1, they can confirm the reception of a command from the headset 1. Furthermore, they are able to give status information, e.g. channel selected or track being played etc., to the headset 1 and thus also to the mobile phone 2.

As indicated in the FIGS. 1 and 4 there are no wireless connections between the mobile phone 2 and any of the peripheral electronic devices 3, 4, 5. Furthermore, there is no need for wireless connections between the peripheral electronic devices 3, 4, 5. Instead, all wireless connections are routed back thru the headset 1 which has now become the hub/controller of all other units, typically thru wireless connections.

In the disclosed preferred embodiment, the headset Bluetooth receiver 14 and the headset Bluetooth transmitter 16 are separate units. However, in an alternate embodiment they could be combined in one TX/RX unit.

In addition, the mobile phone 2 and all the peripheral electronic devices 3, 4, 5 are provided with Bluetooth transceivers, 13, 31, 41, 51, but could be provided with separate receivers and transmitters as well.

In the disclosed preferred embodiment, Bluetooth is chosen as the connection standard used for transmitting control signals, data signals and audio signals between the headset 1, and the mobile phone 2, and between the headset 1 and the peripheral electronic devices 3, 4, 5. However, other standards could be utilised within the scope of the invention. Under all circumstances, the network is a short range network or "personal area network" ("PAN") with local communication links.

During normal use, the headset 1 is connected to the peripheral electronic devices 3, 4, 5 in such way, that only one device is controllable from the mobile phone at a time and only the audio signal from that device is heard through the headset. However, it could be possible to design the headset and remote control software so that the audio signal from one peripheral electronic device is heard through the headset 1, while one of the other peripheral electronic devices is remote controlled via the mobile phone 2. As an example, the user could listen to music from the music player 4 while he is changing channel on the TV 3.

The transceivers 31, 41, 51 of the peripheral electronic devices 3, 4, 5 and 5a can be built in or external adapters.

FIG. 5 discloses a flow chart of how a user can control the system according to the invention.

The present invention also comprises a method of remotely controlling at least one peripheral electronic device (3, 4, 5) which is wirelessly controllable by a wireless headset hub, the method having a least some of the following steps:

configuring the headset hub to include a first transceiver link to communicate with a wireless terminal device; this can be done for example, by Bluetooth® link configuring the headset hub to include a second transceiver link to communicate with said at least one peripheral electronic device, this could also be the same transceiver on a different ID/frequency etc, but it could also be by UHF, wifi, IR or any means that the peripheral device inherently capable of transceiving.

configuring the wireless terminal device to the headset hub for purposes of the hub taking control of its keyboard and/or display c) downloading configuration information from the headset hub to assign at least some keys of the terminal device keyboard to have predetermined functions set by the hub, such functions corresponding to functions needed to control the at least one peripheral electronic device. This can be done by a download of an app to the terminal from the headset or via whatever other means are available for downloading apps to the terminal or by downloading keystroke programming on an as needed basis receiving keystrokes from the terminal device and wirelessly transmitting same to the headset hub. Thus the terminal device does not have to transmit to the peripheral devices, converting the keystrokes received at the hub to wireless transmission signals and sending them to the electronic device in a format know to the peripheral device corresponding to the function assigned to the selected key.

In addition, the method may include a) assigning an audible word or phrase to each assigned key. This phrase can be found in a preassigned look up take for the codes available for the peripheral device (f ex Volume Up, eject disk, etc)

b) playing the audible word or phrase into a speaker in the headset hub, so that a wearer of the headset can audibly hear the function assigned to that key. This will allow the user to hear what the keystroke has done and in a verbose phrase if desired.

c) activating a microphone on the user's headset in response to audible words or phrases transmitted into the speaker. This feature allow user voice input to supplement or override the keystroke function.

d) receiving any voice response from the user while the microphone is activated, e) converting the voice response into a transmission recognizable to the peripheral electronic device, and f) transmitting such recognizable code to the peripheral device.

The user could also use this voice response function to cancel the function of the selected key, extend its action or express any other function, such as STOP, PAUSE, VOLUME TO ZERO, etc.

The present invention provides a simple solution to a problem with "convergence scenarios". If a person is wearing a headset, he/she is probably already carrying a mobile phone. The present invention turns this phone into the remote control unit for all the audio devices to which the headset can be connected. The application running in the mobile phone thus becomes the technology that enables simple wireless convergence in the headset world.

The invention claimed is:

1. The headset system comprising;
   a. a wireless audio headset,
   b. a headset hub contained within said headset for simultaneous use with a plurality of peripheral electronic devices, which are wirelessly connected to and controlled directly through and by the headset hub;
   c. a wireless handheld terminal, which provides keyboard and screen capabilities for user input which are used via the headset hub to control the peripheral electronic devices and wirelessly connected to the headset hub, further including:
       a terminal user interface connecting said handheld terminal to said headset hub and controlled by a script loaded on said terminal downloaded onto the terminal, said interface configured such that status of said peripheral devices is visible on said terminal and user input on the handheld terminal is configured to transmit a signal back to the headset hub and, wherein the headset hub then translates said user input to an appropriate control code in the hub, to a selected peripheral electronic device directly from a wireless signal sent from the headset hub and wherein the peripheral device transmits a signal back to the headset hub, said headset hub being configured to then send an audio link signal back to the user via the headset hub.

2. The headset system according to claim 1, wherein the headset hub is configured to allow the user, via the terminal user interface, to open a direct audio channel between the headset and one selected peripheral electronic device without communication through the wireless handheld terminal.

3. The headset system according to claim 1, wherein the wireless handheld terminal has a display.

4. The headset system according to claim 3, wherein the headset hub is configured to allow the user via the terminal user interface to control a single device and to control the display on the wireless handheld terminal to indicate which device has been chosen to control.

5. The headset system according to claim 4, wherein the headset hub is configured to control the display so that the display indicates which functions of the chosen device can be controlled by the wireless handheld terminal.

6. The headset system according to claim 5, wherein headset hub is configured to control the display so that the display indicates which specific user input controls which specific controllable function.

7. The headset system according to claim 6, wherein the peripheral electronic devices comprise one or more of the following devices: a television, a media player, a video recorder and a personal computer.

8. The headset system according to claim 7, wherein the wireless handheld terminal is a mobile phone, a wireless phone or a personal digital assistant (PDA).

9. The headset system according to claim 1, wherein the terminal user interface comprises a keypad.

10. The headset system according to claim 1, wherein the wireless handheld terminal further comprises
    a terminal control unit for generating first control commands in response to the user input,
    a terminal transmitter for transmitting the first control commands to the headset hub, and wherein
the headset hub comprises
    a headset receiver for receiving the first control commands from the wireless handheld terminal,
    a headset control unit for generating second control commands in response to the reception of the first control commands,
    a headset transmitter for transmitting the second control commands to one of the peripheral electronic devices, and wherein
each of the peripheral electronic devices comprises
    a device receiver for receiving the second control commands,
    a device control unit for controlling the device in response to the reception of the second control commands from the headset hub.

11. The headset system according to claim 1, wherein the headset hub comprises at least one speaker and a headset receiver for receiving a first audio signal and relaying the first audio signal to the speaker.

12. The headset system according to the claim 11, wherein the same headset receiver is adapted to receive the first control commands and the first audio signal.

13. The headset system according to claim 10, wherein the headset comprises a microphone and the headset transmitter for transmitting a second audio signal generated by the microphone.

14. The headset system according to claim 13, wherein the headset transmitter is adapted to transmit the second control commands and the second audio signal.

15. The headset system according to claim 1 wherein the audio link signal back to the user via the headset hub includes a confirmation audio message to the user via the headset, signifying a command sent from the headset hub to the peripheral device has been received.

16. The headset system according to claim 1 wherein the audio link signal back to the user via the headset hub includes a confirmation audio message to the user via the headset, signifying a keystroke on the wireless handheld terminal was received by the headset hub, so that the user will know keystroke has been selected without visual confirmation.

17. The headset system according to claim 1 wherein the audio link signal back to the user via the headset hub includes a confirmation audio message to the user via the headset,
    further includes audio capture from the user to override an action of the hub in response to said confirmation message.

18. A headset system for centralized wireless control of centralized peripheral devices comprising:
    a wireless wearable headset;
    a communications headset hub located within said headset, said hub including a wireless channel for connection to a plurality of peripheral electronic devices, which is wirelessly connected to and controlled directly through and by the headset hub and at least one wireless handheld terminal with keyboard and display capabilities for user input;
    interface script software installable in said terminal device configured to give said headset hub selectable control over the screen and keyboard of the terminal; said interface software being configured to display the status of said peripheral devices and such that user input on the handheld terminal transmits signals to said headset hub and wherein the headset hub then translates said user input to an appropriate control code and for transmission to a user selected at least one peripheral electronic devices directly from a wireless signal sent from the headset hub and wherein the headset hub is configured to then send an audio signal back to the user via the headset hub confirming the action of designated from the terminal, so that the user can hear that the desired action has been initiated audibly.

* * * * *